United States Patent
Mu et al.

(10) Patent No.: US 12,347,829 B2
(45) Date of Patent: Jul. 1, 2025

(54) BATTERY

(71) Applicant: ZHUHAI COSMX BATTERY CO., LTD., Zhuhai (CN)

(72) Inventors: Yingdi Mu, Zhuhai (CN); Hai Wang, Zhuhai (CN); Suli Li, Zhuhai (CN)

(73) Assignee: ZHUHAI COSMX BATTERY CO., LTD., Zhuhai (CN)

( * ) Notice: Subject to any disclaimer, the term of this patent is extended or adjusted under 35 U.S.C. 154(b) by 0 days.

(21) Appl. No.: 18/400,403

(22) Filed: Dec. 29, 2023

(65) Prior Publication Data

US 2024/0136582 A1    Apr. 25, 2024

Related U.S. Application Data

(63) Continuation-in-part of application No. PCT/CN2022/133613, filed on Nov. 23, 2022.

(30) Foreign Application Priority Data

Nov. 23, 2021 (CN) .......................... 202111394913.2
Nov. 23, 2021 (CN) .......................... 202111394925.5
(Continued)

(51) Int. Cl.
*H01M 10/0567*    (2010.01)
*H01M 4/131*    (2010.01)
(Continued)

(52) U.S. Cl.
CPC ....... *H01M 10/0567* (2013.01); *H01M 4/131* (2013.01); *H01M 4/362* (2013.01);
(Continued)

(58) Field of Classification Search
None
See application file for complete search history.

(56) References Cited

U.S. PATENT DOCUMENTS

2006/0046137 A1    3/2006    Kodama
2009/0297949 A1    12/2009    Berkowitz et al.
(Continued)

FOREIGN PATENT DOCUMENTS

CN    101814629 A    8/2010
CN    103413975 A    11/2013
(Continued)

OTHER PUBLICATIONS

International Search Report issued in corresponding PCT Application No. PCT/CN2022/133613, dated Feb. 7, 2023.
(Continued)

*Primary Examiner* — Zhongqing Wei
(74) *Attorney, Agent, or Firm* — Westbridge IP LLC

(57) ABSTRACT

Disclosed is a battery. The battery includes a positive electrode plate, a negative electrode plate, a non-aqueous electrolyte solution, and a separator. An electrolyte additive includes fluoroethylene carbonate. A termination tape of the positive electrode plate is disposed at a paste coating tail of the positive electrode plate. An area of a termination tape of the positive electrode plate is A $cm^2$, a content of fluoroethylene carbonate is B2 wt %; and a width of the positive electrode plate is C cm; wherein a ratio of A to B2 is in a range of 0.5-5 and a ratio of A to C is in a range of 1 to 3. The termination tape includes a substrate and a (meth) acrylic acid termination adhesive layer coated on a surface of the substrate. The battery can effectively improve high-temperature performance.

17 Claims, 1 Drawing Sheet

(30) Foreign Application Priority Data

| Nov. 23, 2021 | (CN) | 202111394938.2 |
|---|---|---|
| Nov. 23, 2021 | (CN) | 202111396647.7 |
| Nov. 23, 2021 | (CN) | 202111396648.1 |
| Nov. 23, 2021 | (CN) | 202111396652.8 |
| Nov. 23, 2021 | (CN) | 202111396653.2 |
| Nov. 23, 2021 | (CN) | 202111396654.7 |

(51) Int. Cl.

| H01M 4/36 | (2006.01) |
|---|---|
| H01M 4/48 | (2010.01) |
| H01M 4/505 | (2010.01) |
| H01M 4/525 | (2010.01) |
| H01M 4/583 | (2010.01) |
| H01M 4/62 | (2006.01) |
| H01M 10/0525 | (2010.01) |
| H01M 10/0569 | (2010.01) |
| H01M 10/0585 | (2010.01) |
| H01M 50/586 | (2021.01) |
| H01M 50/595 | (2021.01) |
| H01M 4/02 | (2006.01) |

(52) U.S. Cl.
CPC .......... *H01M 4/483* (2013.01); *H01M 4/505* (2013.01); *H01M 4/525* (2013.01); *H01M 4/583* (2013.01); *H01M 4/62* (2013.01); *H01M 10/0525* (2013.01); *H01M 10/0569* (2013.01); *H01M 10/0585* (2013.01); *H01M 50/586* (2021.01); *H01M 50/595* (2021.01); *H01M 2004/027* (2013.01); *H01M 2004/028* (2013.01); *H01M 2300/0025* (2013.01); *H01M 2300/0034* (2013.01)

(56) References Cited

U.S. PATENT DOCUMENTS

| 2011/0217577 | A1 | 9/2011 | Fukui et al. | |
|---|---|---|---|---|
| 2013/0177812 | A1* | 7/2013 | Han | H01M 4/525 |
| | | | | 252/520.5 |
| 2014/0120408 | A1* | 5/2014 | Kim | H01M 50/46 |
| | | | | 156/60 |
| 2017/0084958 | A1 | 3/2017 | Ueda et al. | |
| 2020/0075928 | A1* | 3/2020 | Kang | H01M 50/489 |

FOREIGN PATENT DOCUMENTS

| CN | 203434247 U | 2/2014 |
|---|---|---|
| CN | 103746151 A | 4/2014 |
| CN | 103762387 A | 4/2014 |
| CN | 105355921 A | 2/2016 |
| CN | 105368336 A | 3/2016 |
| CN | 105977507 A | 9/2016 |
| CN | 106463768 A | 2/2017 |
| CN | 106797055 A | 5/2017 |
| CN | 106905884 A | 6/2017 |
| CN | 107615549 A | 1/2018 |
| CN | 108219694 A | 6/2018 |
| CN | 108598488 A | 9/2018 |
| CN | 109301318 A | 2/2019 |
| CN | 109546219 A | 3/2019 |
| CN | 207705300 U | 8/2019 |
| CN | 110224169 A | 9/2019 |
| CN | 209434285 U | 9/2019 |
| CN | 110676458 A | 1/2020 |
| CN | 110797575 A | 2/2020 |
| CN | 110911752 A | 3/2020 |
| CN | 111342129 A | 6/2020 |
| CN | 111433952 A | 7/2020 |
| CN | 111463497 A | 7/2020 |
| CN | 111628218 A | 9/2020 |
| CN | 111900316 A | 11/2020 |
| CN | 112018376 A | 12/2020 |
| CN | 112072180 A | 12/2020 |
| CN | 112117491 A | 12/2020 |
| CN | 112397685 A | 2/2021 |
| CN | 112582580 A | 3/2021 |
| CN | 112670558 A | 4/2021 |
| CN | 113078364 A | 7/2021 |
| CN | 113193233 A | 7/2021 |
| CN | 113381058 A | 9/2021 |
| CN | 113410581 A | 9/2021 |
| CN | 113422105 A | 9/2021 |
| CN | 113437366 A | 9/2021 |
| CN | 113471569 A | 10/2021 |
| CN | 114050232 A | 2/2022 |
| CN | 114094048 A | 2/2022 |
| CN | 114094049 A | 2/2022 |
| CN | 114094105 A | 2/2022 |
| CN | 114094167 A | 2/2022 |
| CN | 114122518 A | 3/2022 |
| CN | 114122637 A | 3/2022 |
| CN | 114122638 A | 3/2022 |
| JP | 2000243444 A | 9/2000 |
| JP | 2000348776 A | 12/2000 |
| JP | 2002198099 A | 7/2002 |
| JP | 2002313425 A | 10/2002 |
| JP | 2005011699 A | 1/2005 |
| JP | 2005126452 A | 5/2005 |
| JP | 2005243486 A | 9/2005 |
| JP | 2006286337 A | 10/2006 |
| JP | 2007080795 A | 3/2007 |
| JP | 2008010242 A | 1/2008 |
| JP | 2010073367 A | 4/2010 |
| JP | 2012226991 A | 11/2012 |
| JP | 2013030456 A | 2/2013 |
| JP | 2013225388 A | 10/2013 |
| JP | 2014127242 A | 7/2014 |
| JP | 2015213014 A | 11/2015 |
| JP | 2015213016 A | 11/2015 |
| JP | 2019179741 A | 10/2019 |
| JP | 2019192339 A | 10/2019 |
| JP | 2019207797 A | 12/2019 |
| JP | 2021101432 A | 7/2021 |
| JP | 2021166244 A | 10/2021 |
| KR | 20160058598 A | 5/2016 |
| WO | 2013077156 A1 | 5/2013 |
| WO | 2015064411 A1 | 5/2015 |
| WO | 2017008269 A1 | 1/2017 |
| WO | 2018120793 A1 | 7/2018 |
| WO | 2018123088 A1 | 7/2018 |
| WO | 2018179782 A1 | 10/2018 |
| WO | 2020119809 A1 | 6/2020 |
| WO | 2021149310 A1 | 7/2021 |
| WO | 2021189467 A1 | 9/2021 |

OTHER PUBLICATIONS

Notice of Reasons for Refusal issued in counterpart Japanese Patent Application No. JP 2023-579755, dated Jan. 28, 2025.

\* cited by examiner

BATTERY

CROSS-REFERENCE TO RELATED APPLICATIONS

The present disclosure is a continuation-in-part of International Application No. PCT/CN2022/133613, filed on Nov. 23, 2022, which claims priority to Chinese Patent Application No. 202111394913.2, filed on Nov. 23, 2021, Chinese Patent Application No. 202111396648.1, filed on Nov. 23, 2021, Chinese Patent Application No. 202111396654.7, filed on Nov. 23, 2021, Chinese Patent Application No. 202111396652.8, filed on Nov. 23, 2021, Chinese Patent Application No. 202111394938.2, filed on Nov. 23, 2021, Chinese Patent Application No. 202111396647.7, filed on Nov. 23, 2021, Chinese Patent Application No. 202111394925.5, filed on Nov. 23, 2021, and Chinese Patent Application No. 202111396653.2, filed on Nov. 23, 2021. All of the aforementioned patent applications are hereby incorporated by reference in their entireties.

TECHNICAL FIELD

The present disclosure belongs to the field of battery technologies, and specifically relates to a battery.

BACKGROUND

In recent years, batteries have been widely used in a smartphone, a tablet computer, intelligent wearing, an electric tool, an electric vehicle, and other fields. With wide application of batteries, consumers' requirements on energy density and use environment of the batteries are constantly increasing, which requires that the batteries have good high-temperature safety performance at high voltage.

Currently, there is a potential safety hazard during use of lithium-ion batteries. For example, when a battery is in some extreme use cases such as a continuous high temperature, a serious safety accident easily occurs, and a serious safety accident such as a fire or even an explosion caused by deformation of a battery cell may occur. Therefore, it is very important to improve high-temperature safety performance of a battery.

SUMMARY

An objective of the present disclosure is to provide a new battery for improving high-temperature safety performance of a battery. The battery has excellent high-temperature safety performance, and can also display good high-temperature safety performance at high voltage.

To achieve the foregoing objective, the present disclosure provides a battery. The battery includes a positive electrode plate, a negative electrode plate, a non-aqueous electrolyte solution, and a separator. A termination tape of the positive electrode plate is disposed at a paste coating tail of the positive electrode plate. The non-aqueous electrolyte solution includes a non-aqueous organic solvent, a lithium salt, and an electrolyte additive; and the electrolyte additive includes fluoroethylene carbonate. An area of a termination tape of the positive electrode plate is A $cm^2$; using a total weight of the non-aqueous electrolyte solution as a reference, a content of fluoroethylene carbonate is B2 wt %; and a width of the positive electrode plate is C cm; wherein a ratio of A to B2 is in a range of 0.5-5 and a ratio of A to C is in a range of 1 to 3. The termination tape includes a substrate and a (meth)acrylic acid termination adhesive layer coated on a surface of the substrate.

A battery in the present disclosure is a high-voltage battery and has excellent high-temperature performance.

An endpoint and any value of the ranges disclosed herein are not limited to the exact ranges or values, and these ranges or values shall be understood to include values close to these ranges or values. For a numerical range, one or more new numerical ranges may be obtained in combination with each other between endpoint values of respective ranges, between endpoint values of respective ranges and individual point values, and between individual point values, and these numerical range should be considered as specifically disclosed herein.

DETAILED DESCRIPTION OF THE EMBODIMENTS

The present disclosure is further described in detail below with reference to specific embodiments. It should be understood that the following embodiments are merely for the purposes of illustrating and explaining the present disclosure, and should not be construed as limiting the scope of protection of the present disclosure. Any technology implemented based on the foregoing contents of the present disclosure falls within the intended scope of protection of the present disclosure.

A first aspect of the present disclosure provides a battery, where the battery includes a positive electrode plate, a negative electrode plate, a non-aqueous electrolyte solution, and a separator. The non-aqueous electrolyte solution includes a non-aqueous organic solvent, a lithium salt, and an optional electrolyte additive. A termination tape of the positive electrode plate is disposed at a paste coating tail of the positive electrode plate.

<Termination Tape of a Positive Electrode Plate>

A termination tape of a positive electrode plate is disposed at a paste coating tail of the positive electrode plate, so that a tail of a battery cell can be fixed, and burrs on a cut edge of the positive electrode plate can be covered, so as to prevent a battery from being short-circuited, thereby providing insulation protection. However, the applicant found that local deformation and warping easily occur on the termination tape at high temperature and high pressure. When the deformation and warping uplift to a specific extent, a short-circuit risk may occur. In this way, the applicant makes an in-depth study on a size of the termination tape, and finds that when a ratio of an area of the termination tape to a width of the positive electrode plate is in a range of 1 to 3, the termination tape can cover surfaces of paste and foil uncoating surfaces more properly, minimize the impact of an electrolyte on an adhesive layer, and control the short-circuit risk caused by deformation and warping to a low degree.

Figure 1:
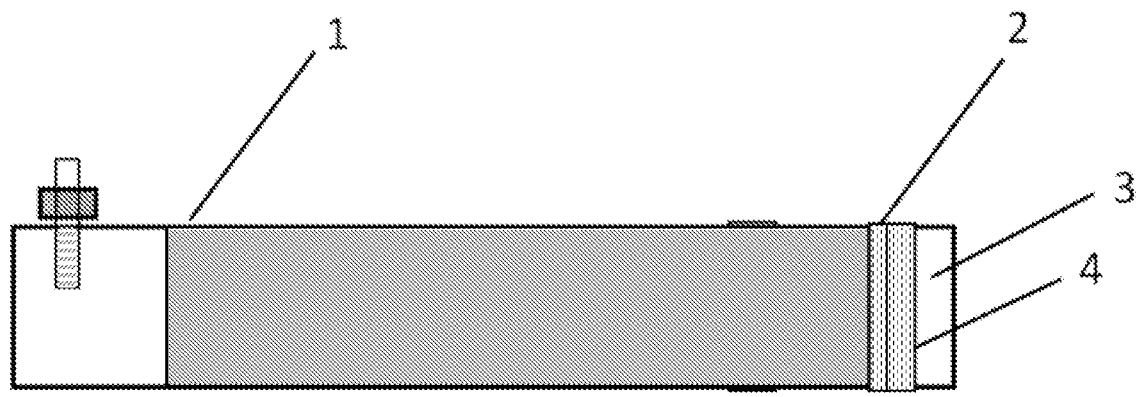
FIG. 1 is a schematic structural diagram of a positive electrode plate according to an example of the present disclosure.
Figure 2:
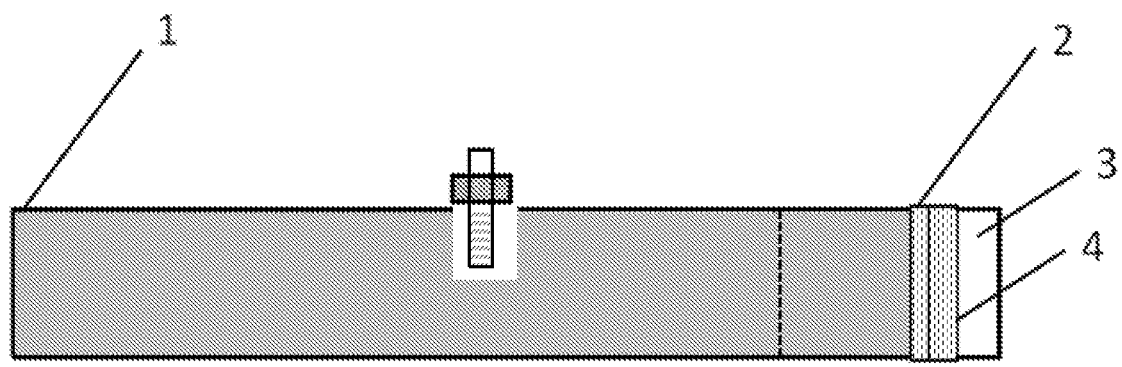
FIG. 2 is a schematic structural diagram of a positive electrode plate in another example of the present disclosure.
Figure 3:
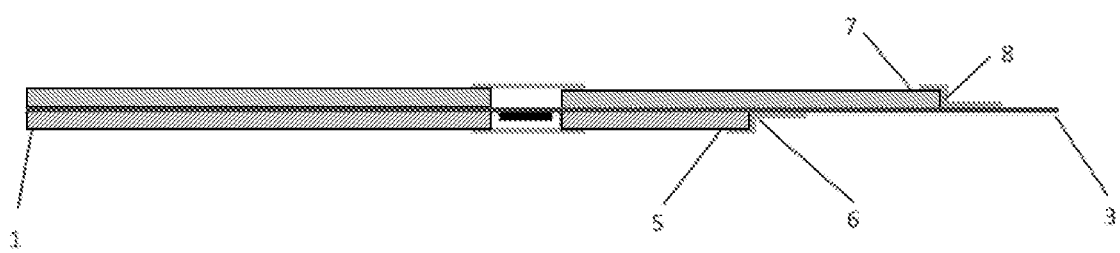
FIG. 3 is a side view of the positive electrode plate in FIG. 2.

In the present disclosure, the term "termination tape of a positive electrode plate" refers to an adhesive tape on the tail of a paste (such as a positive electrode active material layer)

provided on a surface of a positive electrode current collector in a positive electrode plate. As shown in the accompanying drawings, FIG. 1 and FIG. 2 respectively show structural diagrams of positive electrode plates in two examples (positions of a tab are different), where 1 denotes a head of the positive electrode plate; 2 denotes a tail of the positive electrode plate; and 3 denotes a foil uncoating region. In a battery, there are two termination tapes of a positive electrode plate, that is, a plate termination tape of the positive electrode plate is provided on both side surfaces of a positive electrode current collector in the positive electrode plate. As shown in FIG. 3, 5 denotes a paste coating tail on one side of a positive electrode plate; 6 denotes a termination tape on one side of the positive electrode plate; 7 denotes a paste coating tail on the other side of the positive electrode plate; and 8 denotes a termination tape on the other side of the positive electrode plate. It may be learned from FIG. 3, a part of each of the plate termination tapes 6 and 8 of the positive electrode plate covers pastes 5 and 7 on surfaces of the positive electrode current collector, respectively, and the other part covers surfaces of the positive electrode current collector (namely, a foil uncoating region 3 on the surfaces of the positive electrode current collector). The termination tape 4, 6, or 8 of the positive electrode plate covers both a part of a paste and a part of a foil uncoating region. As shown in FIG. 1, there is a vertical line in the middle of the termination tape 4 of the positive electrode plate (the vertical line is a crease, generated by an intersection of the paste and the foil uncoating region, of the termination tape of the positive electrode plate). A region on the left side of the vertical line is covered by the paste (a part of tail 2 of the positive electrode plate is covered), and a region on the right side of the vertical line is covered by the foil uncoating region.

An area of a termination tape of the positive electrode plate is A $cm^2$, a width of the positive electrode plate is C cm, and a ratio of A to C is in a range of 1 to 3.

An area A of the termination tape of the positive electrode plate is an area of a termination tape of the positive electrode plate disposed on one side surface of a positive electrode current collector of the positive electrode plate. In an example, termination tapes of the positive electrode plate provided on two side surfaces of the positive electrode current collector in the positive electrode plate have a same area.

For example, a ratio of A to C is 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, or a point value in a range formed by any two of the foregoing values.

In an example, the ratio of A to C is in a range of 1.6-2.2.

In the present disclosure, "ratio" generally refers to a proportion calculated by using a numerical portion of two parameters.

The area A of the termination tape of the positive electrode plate may be adjusted depending on a size of the positive electrode plate, an actual requirement, and the ratio of A to C, for example, may be in a range of 3-120 $cm^2$. For example, the area A of the termination tape of the positive electrode plate is 3 $cm^2$, 5 $cm^2$, 10 $cm^2$, 20 $cm^2$, 30 $cm^2$, 40 $cm^2$, 50 $cm^2$, 60 $cm^2$, 70 $cm^2$, 80 $cm^2$, 90 $cm^2$, 100 $cm^2$, 120 $cm^2$, or a point value in a range formed by any two of the foregoing values.

The width C of the positive electrode plate may be adjusted depending on a battery size, an actual requirement, and the ratio of A to C, for example, be in a range of 1-120 cm. For example, the width C of the positive electrode plate is 1 cm, 3 cm, 5 cm, 6 cm, 8 cm, 10 cm, 16 cm, 20 cm, 30 cm, 40 cm, 50 cm, 60 cm, 70 cm, 80 cm, 90 cm, 100 cm, 110 cm, 120 cm, or a point value in a range formed by any two of the foregoing values.

The applicant found that an important reason for occurrence of local deformation and warping of a termination tape is that an adhesive layer is easily dissolved in an electrolyte solution at high temperature and high pressure. Therefore, to reduce impact of the electrolyte solution on the termination tape, and to further reduce a risk of short-circuit caused by deformation and warping of the termination tape, the applicant makes an in-depth study on a material of the adhesive layer of the termination tape.

In an example, the termination tape includes a substrate and a termination adhesive layer coated on a surface of the substrate.

The substrate may be a conventional substrate used as a termination tape in the art, for example, PET (Polyethylene terephthalate).

In an example, the termination adhesive layer uses a conventional material in the art.

In an example, the termination adhesive layer is a (meth)acrylic acid termination adhesive layer.

In an example, the (meth)acrylic acid termination adhesive layer includes cross-linked modified (meth)acrylic acid and/or cross-linked modified (meth)acrylate.

In an example, the (meth)acrylate is selected from C1-C10 alkyl (meth)acrylates, for example, is selected from at least one of isooctyl acrylate, n-butyl acrylate, methyl acrylate, ethyl acrylate, n-propyl acrylate, or the like.

In the present disclosure, "(meth)" in "(meth)acrylic acid" and "(meth)acrylate" means that it may or may not be present, that is, the (meth)acrylic acid termination adhesive layer includes at least one of cross-linked modified methacrylic acid, cross-linked modified acrylic acid, cross-linked modified methacrylate, or cross-linked modified acrylate.

The (meth)acrylic acid termination adhesive layer is obtained by cross-linking modification of a second base under an action of a second cross-linking agent, and the second base is selected from at least one of methacrylic acid, acrylic acid, methacrylate, or acrylate.

In an example, the second cross-linking agent includes vinylene carbonate. Vinylene carbonate can participate in cross-linking polymerization of acrylic acid, so that an acrylic acid termination adhesive layer includes an ethyl carbonate structure chain, making the acrylic acid termination adhesive layer more resistant to high temperature and high pressure, stabilizing an adhesive layer structure, and further improving high temperature performance of a battery cell.

In an example, using a total weight of the cross-linked modified (meth)acrylic acid and/or cross-linked modified (meth)acrylate as a reference, a content of vinylene carbonate ranges from 0.5 wt % to 5 wt %, for example, is 0.5 wt %, 0.6 wt %, 0.7 wt %, 0.8 wt %, 0.9 wt %, 1 wt %, 1.2 wt %, 1.5 wt %, 1.8 wt %, 2 wt %, 2.5 wt %, 3 wt %, 3.5 wt %, 3.8 wt %, 4 wt %, 4.5 wt %, or 5 wt %.

The termination adhesive layer may further include another conventional component such as an auxiliary agent. The auxiliary agent is, for example, selected from at least one of an antioxidant, an inorganic filler, or the like.

The antioxidant may be a conventional antioxidant suitable for a principal component (for example, a cross-linked modified rubber, or cross-linked modified (meth)acrylic acid and/or cross-linked modified (meth)acrylate).

The inorganic filler may be a conventional inorganic filler suitable for a primary component.

In an example, a thickness of the positive electrode plate termination tape ranges from 8 μm to 20 μm, for example, is 8 μm, 9 μm, 10 μm, 11 μm, 12 μm, 13 μm, 14 μm, 15 μm, 16 μm, 17 μm, 18 μm, 19 μm, or 20 μm.

<Lithium Salt in an Electrolyte Solution>

The applicant also found that an electrolyte solution is also an important factor that affects safety performance of a battery at high temperature and high pressure. A possible reason is that in a conventional technology, the electrolyte solution is easily decomposed at high temperature and high pressure, and redox decomposition occurs on surfaces of positive and negative electrodes to destroy an SEI film, causing impedance of a battery cell to continuously increase, and deteriorating cell performance. Therefore, the applicant makes an in-depth study on a composition of the electrolyte solution.

The non-aqueous electrolyte solution includes a non-aqueous organic solvent, a lithium salt, and an optional electrolyte additive. The applicant found that performance of the non-aqueous electrolyte solution can be more stable at high temperature and high pressure by controlling a content of a lithium salt and/or by using an electrolyte additive with a specific content and composition.

In a $Y1^{th}$ implementation, a concentration of the lithium salt is specially controlled. Using a total weight of the non-aqueous electrolyte solution as a reference, a content of the lithium salt is denoted as B1 mol/L.

In an example, a ratio of A to B1 is in a range of 2-20. For example, the ratio of A to B1 is 2, 3, 4, 5, 6, 7, 8, 9, 10, 11, 12, 13, 14, 15, 16, 17, 18, 19, 20, or a point value in a range formed by any two of the foregoing values.

In the present disclosure, "in a range of a-b" represents that two endpoint values and any value between a and b are included.

In an example, the content B1 of the lithium salt ranges from 1 mol/L to 6 mol/L, for example, is 1 mol/L, 1.5 mol/L, 2 mol/L, 2.5 mol/L, 3 mol/L, 3.5 mol/L, 4 mol/L, 5 mol/L, or 6 mol/L. The concentration of the lithium salt in the present disclosure is higher than a lithium salt concentration commonly used in a conventional technology (usually 1.2 mol/L or less).

Preferably, the lithium salt is selected from at least one of lithium bis(trifluoromethanesulfonyl)imide, lithium bis(fluorosulfonyl)imide, or lithium hexafluorophosphate.

<Electrolyte Additive in an Electrolyte Solution>

In a $Y2^{th}$ implementation, the electrolyte additive includes fluoroethylene carbonate. Using a total weight of the non-aqueous electrolyte solution as a reference, a content of fluoroethylene carbonate is denoted as B2 wt %.

In an example, a ratio of A to B2 is in a range of 0.5-5. For example, the ratio of A to B2 is 0.5, 0.8, 1, 1.2, 1.4, 1.5, 1.8, 2, 2.2, 2.5, 2.8, 3, 3.2, 3.5, 3.8, 4, 4.5, 5, or a point value in a range formed by any two of the foregoing values.

In an example, using a total weight of the non-aqueous electrolyte solution as a reference, the content B2 of fluoroethylene carbonate ranges from 5 wt % to 30 wt %, and for example, is 5 wt %, 6 wt %, 7 wt %, 8 wt %, 9 wt %, 10 wt %, 12 wt %, 15 wt %, 18 wt %, 20 wt %, 22 wt %, 25 wt %, 28 wt %, or 30 wt %.

In an example, the content of fluoroethylene carbonate ranges from 5 wt % to 10 wt %.

The electrolyte additive may further include another component, which is, for example, selected from at least one of 1,3-propanesulfonic acid lactone, 1-propene 1,3-sultone, ethylene sulphite, ethylene sulfate, lithium bis(oxalate) borate, lithium difluoro oxalate phosphate, or vinyl ethylene carbonate.

In an example, using a total weight of the non-aqueous electrolyte solution as a reference, a total content of the another component ranges from 0 wt % to 10 wt %, for example, is 1 wt %, 2 wt %, 3 wt %, 4 wt %, 5 wt %, 6 wt %, 7 wt %, 8 wt %, 9 wt %, or 10 wt %. When the content is 0 wt %, it indicates that the non-aqueous electrolyte solution does not include the another component.

<Non-Aqueous Organic Solvent>

The non-aqueous electrolyte solution further includes a non-aqueous organic solvent, and the non-aqueous organic solvent may be a conventional organic solvent in the art, for example, may be at least one of a carbonate, a carboxylic acid ester, or a fluorinated ether. The carbonate is, for example, selected from one or more combinations of ethylene carbonate, propylene carbonate, dimethyl carbonate, ethyl methyl carbonate, diethyl carbonate, or methyl propyl carbonate. The carboxylic acid ester is, for example, selected from one or more combinations of ethyl propionate or propyl propionate. The fluorinated ether, for example, is selected from 1,1,2,3-tetrafluoroethyl-2,2,3,3-tetrafluoropropyl ether.

In an example, the non-aqueous organic solvent includes a combination of ethylene carbonate (EC), propylene carbonate (PC), propyl propionate (PP), 1,1,2,3-tetrafluoroethyl-2,2,3,3-tetrafluoropropyl ether in a weight ratio of (1-3):(0.5-2):(2-4):(1-3).

<Combination of an Electrolyte Solution and a Termination Tape of a Positive Electrode>

According to the present disclosure, a short-circuit risk caused by deformation and warping of a termination tape can be reduced by specially limiting a size of the termination tape of a positive electrode plate. In a preferred solution, a material of a termination adhesive layer on the termination tape of the positive electrode plate is further limited, so that a phenomenon that the adhesive layer is easily dissolved in an electrolyte solution at high temperature and high pressure can be further reduced, thereby further reducing a short-circuit risk caused by deformation and warping of the termination tape.

A limitation on the electrolyte solution can have synergistic effect with a limitation on the termination tape of the positive electrode plate described above (in particular, a limitation on the material of the termination adhesive layer), so that high-temperature performance of a battery cell of the prepared battery can be effectively improved, and a problem of lithium deposition at an edge of an electrode plate occurred after cycling of the battery cell can also be solved. This avoids problems, such as thickness failure in high-temperature storage and lithium deposition in high-temperature cycling of the battery cell caused by warping and deformation of the termination tape of the positive electrode plate, the adhesive layer in the termination tape of the positive electrode plate being easily soluble in a non-aqueous electrolyte solution, and the non-aqueous electrolyte solution being easily oxidized, reduced and decomposed at positive and negative interfaces, occurred when the battery is used in a high-temperature environment.

When the non-aqueous electrolyte solution includes a high concentration of solute lithium salt, the high concentration of solute lithium salt is more conducive to enhancing an interaction between a solute and a solvent in the solution, and free solvent molecules disappear, forming a new non-aqueous electrolyte solution, that is, a high concentration of non-aqueous electrolyte solution, which is more conducive to forming a specific three-dimensional network structure of the non-aqueous electrolyte solution in a current proportion. Ions (such as lithium ions) coordinate with limited free solvent molecules and anions, which is significantly different from a conventional low-concentration electrolyte solution with free solvent molecules as a main body, and may better slow down aging of an adhesive layer in a termination tape of a positive electrode plate after the termination tape of the positive electrode plate is soaked in the non-aqueous electrolyte solution, so that the adhesive layer still maintains a good multi-flex resistance and binding force. This ensures that the adhesive layer still maintains tensile strength after being soaked in the non-aqueous electrolyte solution, delays aging and failure of the termination tape of the positive electrode plate, prevents the adhesive layer from overflowing the termination tape of the positive electrode plate and covering a surface of a positive electrode active material to cause hole plugging, improves deformation of a battery cell due to warping of the termination tape of the positive electrode plate, and also solves problems such as lithium deposition at an edge caused by the hole plugging during cycling of the battery cell. Further, as a concentration of the lithium salt increases, a working voltage range of the non-aqueous electrolyte solution becomes wider, a high-voltage positive electrode material is matched to implement stable charging and discharging, and combustible solvent molecules are less, so that a reaction between the electrolyte solution and active oxygen generated from the positive electrode may be alleviated, and a service life and safety of the battery (especially secondary lithium-ion battery) may be improved.

When the non-aqueous electrolyte solution includes fluoroethylene carbonate, fluoroethylene carbonate can have good synergistic effect with the termination tape of the positive electrode plate. Specifically, fluoroethylene carbonate is a carbonate compound with high viscosity, large intermolecular dipole moment, and strong polarity, and has poor compatibility with the termination adhesive layer in the termination tape of the positive electrode plate. When a ratio of A to B2 is in a range of 0.5-5, an intermolecular force of the termination adhesive layer may be strengthened after the termination tape of the positive electrode plate is soaked in the non-aqueous electrolyte solution, to suppress flow and dispersion of the termination adhesive layer when the termination adhesive layer is soaked in the non-aqueous electrolyte solution, so that the termination adhesive layer maintains good viscosity. This delays aging and failure of the termination tape of the positive electrode plate, prevents the termination adhesive layer from overflowing the termination tape of the positive electrode plate and covering a surface of a positive electrode active material to cause hole plugging, improves deformation of a battery cell due to warping of the termination tape of the positive electrode plate occurred after high-temperature storage of the battery cell, and also solves problems such as lithium deposition at an edge caused by the hole plugging during cycling of the battery cell. In addition, fluoroethylene carbonate may form a relatively strong SEI film on surfaces of positive and negative electrodes, stabilizing positive and negative electrode interfaces at high temperature and high pressure, reducing side reactions and generation of hydrofluoric acid, and avoiding corrosion and damage of the hydrofluoric acid to the termination adhesive layer. This further slows down aging and failure of the termination adhesive layer after the termination tape of the positive electrode plate is soaked in the non-aqueous electrolyte solution, prevents the termination adhesive layer from overflowing the termination tape of the positive electrode plate and covering a surface of a positive electrode active material to cause hole plugging, improves deformation of a battery cell due to warping of the termination tape of the positive electrode plate occurred after high-temperature storage of the battery cell, and also solves problems such as lithium deposition at an edge caused by the hole plugging during cycling of the battery (especially secondary lithium-ion battery).

<Other Parts of a Battery>

Other components and elements of the battery may be disposed in a conventional manner in the art.

In an example, the positive electrode plate includes a positive electrode current collector and a positive electrode active material layer coated on a surface of either or both sides of the positive electrode current collector. The positive electrode active material layer includes a positive electrode active material, a conductive agent, and a binder.

The positive electrode active material is selected from lithium cobalt oxide or lithium cobalt oxide doped and coated with two or more elements in Al, Mg, Mn, Cr, Ti, and Zr. A chemical formula of the lithium cobalt oxide doped and coated with the two or more elements in Mg, Mn, Cr, Ti, and Zr is $Li_xCo_{1-y1-y2-y3-y4}A_{y1}B_{y2}C_{y3}D_{y4}O_2$, where $0.95 \le x \le 1.05$, $0.01 \le y1 \le 0.1$, $0.01 \le y2 \le 0.1$, $0 \le y3 \le 0.1$, $0 \le y4 \le 0.1$, and A, B, C, and D are selected from the two or more elements in Al, Mg, Mn, Cr, Ti, and Zr.

In an example, a negative electrode plate includes a negative electrode current collector and a negative electrode active material layer coated on a surface of either or both sides of the negative electrode current collector, and the negative electrode active material layer includes a negative electrode active material, a conductive agent, and a binder.

In an example, the negative electrode active material is selected from graphite or a graphite composite material including 1-12 wt % $SiO_x/C$ or Si/C.

In an example, a charge cut-off voltage of the battery is 4.45V or above.

In an example, the battery is a secondary lithium-ion battery.

EXAMPLE

Experimental methods used in the following examples are conventional methods, unless otherwise specified. Reagents, materials, and the like used in the following examples are all commercially available, unless otherwise specified.

In the following examples and comparative examples, components of a lithium-ion battery are prepared and assembled in a manner in the following preparation example, unless otherwise specified.

Preparation Example (1) Preparation of a Positive Electrode Plate

A positive electrode active material $LiCoO_2$, a binder polyvinylidene fluoride (PVDF), and a conductive agent acetylene black were mixed at a weight ratio of 97.2:1.3:1.5, added with N-methylpyrrolidone (NMP). The mixture was stirred under action of a vacuum blender until a mixed system became a positive electrode slurry with uniform fluidity. The positive electrode slurry was evenly applied on aluminum foil having a thickness ranging from 9 μm to 12 μm. The coated aluminum foil was baked in a five-stage oven with different temperatures and then dried in an oven at 120° C. for 8 hours, followed by rolling and cutting, to obtain required positive electrode plates with different sizes. For specific widths of electrode plates, see examples.

(2) Preparation of a Termination Tape of a Positive Electrode Plate

See examples.

(3) Preparation of a Negative Electrode Plate

A negative electrode material artificial graphite with a mass percentage of 96.5%, a conductive agent single-walled carbon nanotube (SWCNT) with a mass percentage of 0.1%, a conductive agent conductive carbon black (SP) with a mass percentage of 1%, a binder sodium carboxymethyl cellulose (CMC) with a mass percentage of 1%, and a binder styrene-butadiene rubber (SBR) with a mass percentage of 1.4% were made into a slurry by using a wet process. The slurry was applied on a surface of a negative electrode current collector with copper foil, and then drying (temperature: 85° C., time: 5 hours), rolling, and die cutting were carried out to obtain negative electrode plates with different sizes.

(4) Preparation of a Non-Aqueous Electrolyte Solution

See examples.

(5) Preparation of a Separator

A polyethylene separator with a thickness ranging from 7 μm to 9 μm is selected.

(6) Preparation of a Lithium-Ion Battery

The positive electrode plate, the separator, and the negative electrode plate that are prepared above were wound, and a termination tape of the positive electrode plate is attached at an end of the positive electrode plate (termination tapes of the positive electrode plate on both sides of the positive electrode current collector have a same area), to obtain an unfilled bare battery cell. The bare cell was placed in outer packaging foil, the prepared electrolyte solution was injected into the dried bare cell, and after processes such as vacuum packaging, standing, forming, shaping, and sorting, the lithium-ion battery required was obtained.

The batteries obtained in examples and comparative examples were separately tested according to the method shown in the following test example.

Test Example (1) 45° C. Cycling Test

The batteries obtained in examples and comparative examples were placed in an environment of (45±2° C.) to stand for 2 to 3 hours. When the battery bodies reached (45±2° C.), the batteries were charged at a constant current of 1C, with a cut-off current of 0.05C. After being fully charged, the batteries were left aside for 5 minutes, and then discharged at a constant current of 0.7C to a cut-off voltage of 3.0 V. The highest discharge capacity for the first three cycles was recorded as an initial capacity Q. When the number of cycles reaches 400, the last discharge capacity of each battery was recorded as $Q_1$, and batteries obtained after 400 cycles are disassembled to record whether lithium deposition occurred on an edge of each battery. Results were recorded in Table 2.

The calculation formula used is as follows: Capacity retention rate (%)=$Q_1$/Q×100%.

(2) High-Temperature Storage Test

The batteries obtained in examples and comparative examples were charged and discharged three times at a charge and discharge C-rate of 0.5C at room temperature, and then charged to a fully charged state at a C-rate of 0.5C, and the highest discharge capacity $Q_2$ and a battery thickness $T_1$ of the first three cycles at 0.5C for each battery were recorded. The batteries in a fully charged state were stored at 85° C. for 6 hours. Upon completion of storage, a battery thickness $T_2$ and a 0.5C discharge capacity $Q_3$ for each battery were recorded, then experimental data such as a thickness change rate and a capacity retention rate that are stored at a high temperature of each battery were obtained by means of calculation, and results were recorded in Table 2.

The calculation formulas used are as follows: Capacity retention rate (%)=$Q_3$/$Q_2$×100%; and Thickness change rate (%)=($T_2$−$T_1$)/$T_1$×100%.

(3) Thermal Shock Test at 130° C.

The batteries obtained in examples and comparative examples were heated in a convection mode or by using a circulating hot air box at a start temperature of (25±3° C.), with a temperature change rate of (5±2° C.)/min. The temperature was raised to (130±2° C.), the batteries were kept at the temperature for 60 minutes, and then the test ended. The recorded status results of the batteries were recorded in Table 2.

In the following examples, the termination tape of the positive electrode plate and/or the non-aqueous electrolyte solution are separately adjusted. These examples are merely used to illustrate exemplary combination manners of the present disclosure, and are not intended to limit a preferred combination manner. A person skilled in the art can infer good effect of other combination manners based on these combination manners.

(1) Preparation of a Termination Tape of a Positive Electrode Plate 38 parts by weight of isooctyl acrylate, 3 parts by weight of butyl acrylate, 3 parts by weight of vinyl acetate, 3 parts by weight of acrylic acid, 5 parts by weight of polyisoprene rubber, 1 part by weight of pentaerythritol trimethacrylate, 1 part by weight of azobiisobutyronitrile, and 36 parts by weight of ethyl ester were mixed and stirred evenly at a temperature of 80° C. to obtain a mixed solution. Then a specific part by weight of cross-linking agent vinylene carbonate was added into the mixed solution, and the resulting mixture was stirred evenly at room temperature and applied on a surface of a PET substrate, to obtain the termination tape of the positive electrode plate.

(2) Preparation of a Non-Aqueous Electrolyte Solution

In an argon-filled glove box (moisture <10 ppm, oxygen <1 ppm), ethylene carbonate (EC), propylene carbonate (PC), propyl propionate (PP), and ethyl propionate (EP) were evenly mixed at a mass ratio of 1:1:3:2, and $LiPF_6$ accounting for 13 wt % of a total mass of the non-aqueous electrolyte solution and an additive (specific amounts and selection of the additive are shown in Table 1) were slowly added into the mixed solution. The mixture was stirred evenly to obtain the non-aqueous electrolyte solution.

(3) Composition and preparation of a positive electrode plate, a negative electrode plate, and a separator, and assembly of a lithium-ion battery were performed according to the preparation example.

Numbers and features of examples and comparative examples are shown in Table 1.

TABLE 1

|  | A (cm²) | B2 (wt %) | C (cm) | A/B2 | A/C | D (wt %) |
|---|---|---|---|---|---|---|
| Comparative Example 1 | 14.25 | 30 | 9 | 0.475 | 1.58 | / |
| Comparative Example 2 | 14.25 | 10 | 15 | 1.425 | 0.95 | / |
| Comparative Example 3 | 14.25 | 30 | 9 | 0.475 | 1.58 | 1.0 |
| Comparative Example 4 | 14.25 | 10 | 15 | 1.425 | 0.95 | 1.0 |
| Comparative Example 5 | 14.25 | / | 9 | / | 1.58 | 1.0 |
| Comparative Example 6 | 14.25 | 10 | 9 | 1.425 | 1.58 | / |

TABLE 1-continued

| | A (cm²) | B2 (wt %) | C (cm) | A/B2 | A/C | D (wt %) |
|---|---|---|---|---|---|---|
| Example 1 | 14.25 | 10 | 9 | 1.425 | 1.58 | 1.0 |
| Example 2 | 12 | 5 | 7 | 2.4 | 1.71 | 1.5 |
| Example 3 | 16 | 7 | 10 | 2.29 | 1.60 | 2.0 |
| Example 4 | 13.5 | 15 | 8 | 0.9 | 1.69 | 3.0 |
| Example 5 | 35 | 30 | 16 | 1.167 | 2.19 | 4.0 |
| Example 6 | 24 | 12 | 12 | 2 | 2.00 | 5.0 |
| Example 7 | 18 | 10 | 10 | 1.8 | 1.6 | 2 |
| Example 8 | 18 | 6 | 10 | 3 | 1.6 | 2 |
| Example 9 | 15 | 15 | 10 | 1 | 1.6 | 2 |
| Example 10 | 90 | 20 | 10 | 4.5 | 1.6 | 2 |
| Comparative Example 7 | 62.4 | 12 | 10 | 5.2 | 1.6 | 2 |
| Example 11 | 28.5 | 7 | 15 | 2.29 | 1.9 | 2 |
| Example 12 | 22 | 7 | 10 | 2.29 | 2.2 | 2 |
| Example 13 | 12 | 7 | 10 | 2.29 | 1.2 | 2 |
| Example 14 | 56 | 7 | 20 | 2.29 | 2.6 | 2 |
| Comparative Example 8 | 31 | 7 | 10 | 2.29 | 3.1 | 2 |
| Example 15 | 16 | 7 | 10 | 2.29 | 1.6 | 1.5 |
| Example 16 | 16 | 7 | 10 | 2.29 | 1.6 | 2.8 |
| Example 17 | 16 | 7 | 10 | 2.29 | 1.6 | 1 |
| Example 18 | 16 | 7 | 10 | 2.29 | 1.6 | 4.5 |

A is an area of a termination tape of a positive electrode plate, in a unit of cm²; B2 is a content of fluoroethylene carbonate in a non-aqueous electrolyte solution, in a unit of wt %; C is a width of a positive electrode plate, in a unit of cm; and D is a content of vinylene carbonate in a non-aqueous electrolyte solution, in a unit of wt %.

The batteries obtained in examples and comparative examples were separately tested according to the method in the test example, and obtained results were recorded in Table 2.

TABLE 2

| | 400 cycles in 45° C. and 1 C cycling | | 85° C. high temperature storage for 6 hours | | Thermal shock for 60 minutes at 130° C. | |
|---|---|---|---|---|---|---|
| | Capacity retention rate | Disassembly status after 400 cycles | Capacity retention rate | Thickness change rate | Ignition (number of passed) | Explosion (number of passed) |
| Comparative Example 1 | 25.2% | Lithium deposition at an edge | 45.9% | 41.2% | 0/5 | 0/5 |
| Comparative Example 2 | 30.1% | Lithium deposition at an edge | 55.2% | 35.5% | 1/5 | 0/5 |
| Comparative Example 3 | 35.8% | Lithium deposition at an edge | 50.3% | 34.3% | 2/5 | 2/5 |
| Comparative Example 4 | 47.6% | Lithium precipitation at edge | 60.2% | 28.1% | 2/5 | 2/5 |
| Comparative Example 5 | 26.4% | Lithium deposition at an edge | 47.9% | 40.9% | 0/5 | 0/5 |
| Comparative Example 6 | 59.1% | No lithium deposition | 67.5% | 18.0% | 4/5 | 4/5 |
| Example 1 | 76.1% | No lithium deposition | 75.2% | 13.8% | 5/5 | 5/5 |
| Example 2 | 72.9% | No lithium deposition | 73.4% | 11.9% | 5/5 | 5/5 |
| Example 3 | 74.4% | No lithium deposition | 77.3% | 10.4% | 5/5 | 5/5 |
| Example 4 | 71.1% | No lithium deposition | 70.8% | 10.6% | 5/5 | 5/5 |
| Example 5 | 68.1% | No lithium deposition | 69.9% | 9.0% | 5/5 | 5/5 |
| Example 6 | 70.9% | No lithium deposition | 72.8% | 10.3% | 5/5 | 5/5 |
| Example 7 | 72.5% | No lithium deposition | 75.9% | 11.1% | 5/5 | 5/5 |
| Example 8 | 71.2% | No lithium deposition | 73.1% | 12.3% | 5/5 | 5/5 |
| Example 9 | 69.8% | No lithium deposition | 70.7% | 13.7% | 5/5 | 5/5 |
| Example 10 | 67.9% | No lithium deposition | 68.3% | 15.6% | 5/5 | 5/5 |
| Comparative Example 7 | 33.8% | Lithium deposition at an edge | 51.5% | 37.1% | 0/5 | 0/5 |
| Example 11 | 76.6% | No lithium deposition | 79.2% | 8.4% | 5/5 | 5/5 |
| Example 12 | 73.3% | No lithium deposition | 76.7% | 9.8% | 5/5 | 5/5 |
| Example 13 | 72.8% | No lithium deposition | 75.9% | 11.2% | 5/5 | 5/5 |
| Example 14 | 71.1% | No lithium deposition | 74.1% | 12.5% | 5/5 | 5/5 |
| Comparative Example 8 | 32.3% | Lithium deposition at an edge | 50.1% | 36.4% | 0/5 | 0/5 |

TABLE 2-continued

|  | 400 cycles in 45° C. and 1 C cycling | | 85° C. high temperature storage for 6 hours | | Thermal shock for 60 minutes at 130° C. | |
| --- | --- | --- | --- | --- | --- | --- |
|  | Capacity retention rate | Disassembly status after 400 cycles | Capacity retention rate | Thickness change rate | Ignition (number of passed) | Explosion (number of passed) |
| Example 15 | 72.2% | No lithium deposition | 76.6% | 11.1% | 5/5 | 5/5 |
| Example 16 | 70.7% | No lithium deposition | 75.8% | 11.6% | 5/5 | 5/5 |
| Example 17 | 69.9% | No lithium deposition | 72.2% | 13.9% | 5/5 | 5/5 |
| Example 18 | 67.1% | No lithium deposition | 70.9% | 15.8% | 5/5 | 5/5 |

It may be learned from the results in Table 2 that, it may be learned from the examples and comparative examples that when a battery is obtained by adding fluoroethylene carbonate into an electrolyte solution and meeting a synergistic relationship with a termination tape of a positive electrode plate, high-temperature performance of a battery cell can be effectively improved, and a problem of lithium deposition at an edge of an electrode plate occurred after cycling of the battery cell can also be solved.

A battery in the present disclosure is a high-voltage battery and has excellent high-temperature performance. A size of a termination tape of a positive electrode plate is controlled, and a material of an adhesive layer is further controlled in a preferred solution, so that based on synergistic effect between the termination tape of the positive electrode plate and a non-aqueous electrolyte solution, high-temperature performance of a battery cell of a prepared battery can be effectively improved, and a problem of lithium deposition at an edge of an electrode plate occurred after cycling of the battery cell can also be solved. This avoids problems, such as thickness failure in high-temperature storage and lithium deposition in high-temperature cycling of the battery cell caused by warping and deformation of the termination tape of the positive electrode plate, the adhesive layer in the termination tape of the positive electrode plate being easily soluble in a non-aqueous electrolyte solution, and the non-aqueous electrolyte solution being easily oxidized, reduced and decomposed at positive and negative interfaces, occurred when the battery is used in a high-temperature environment.

The foregoing illustrates implementations of the present application. However, the present application is not limited to the foregoing implementations. Any modifications, equivalent replacements, and improvements made without departing from the spirit and principle of the present application shall fall within the protection scope of the present application.

What is claimed is:

1. A battery, comprising a positive electrode plate, a negative electrode plate, a non-aqueous electrolyte solution, and a separator; wherein
a termination tape of the positive electrode plate is disposed at a paste coating tail of the positive electrode plate;
the non-aqueous electrolyte solution comprises a non-aqueous organic solvent, a lithium salt, and an electrolyte additive; and the electrolyte additive comprises fluoroethylene carbonate;
an area of a termination tape of the positive electrode plate is A cm$^2$; based on a total weight of the non-aqueous electrolyte solution, a content of fluoroethylene carbonate is B2 wt %; and a width of the positive electrode plate is C cm; wherein a ratio of A to B2 is in a range of 0.5-5 and a ratio of A to C is in a range of 1 to 3;
the termination tape comprises a substrate and a termination adhesive layer coated on a surface of the substrate;
the width of the termination tape exceeds the width of the positive electrode plate;
the termination adhesive layer comprises cross-linked methacrylate or cross-linked acrylate; and
the battery is a secondary lithium-ion battery.

2. The battery according to claim 1, wherein the area A of the termination tape of the positive electrode plate ranges from 3 cm$^2$ and 120 cm$^2$.

3. The battery according to claim 1, wherein the width C of the positive electrode plate ranges from 1 cm to 120 cm.

4. The battery according to claim 1, wherein a ratio of A to C is in a range of 1.6 to 2.2; and/or, a ratio of A to B2 is in a range of 0.8 to 3.

5. The battery according to claim 1, wherein the content B2 wt % of fluoroethylene carbonate ranges from 5 wt % to 30 wt %.

6. The battery according to claim 5, wherein the content B2 wt % of fluoroethylene carbonate ranges from 5 wt % to 10 wt %.

7. The battery according to claim 1, wherein based on a total weight of the non-aqueous electrolyte solution, a content of the lithium salt is B1 mol/L, and a ratio of A to B1 is in a range of 2-20.

8. The battery according to claim 7, wherein the content B1 mol/L of the lithium salt ranges from 1 mol/L to 6 mol/L.

9. The battery according to claim 1, wherein the electrolyte additive further comprises another component, and the another component comprises at least one of 1,3-propanesulfonic acid lactone, 1-propene 1,3-sultone, ethylene sulphite, ethylene sulfate, lithium bis(oxalate) borate, lithium difluoro oxalate phosphate, and vinyl ethylene carbonate.

10. The battery according to claim 9, wherein based on a total weight of the non-aqueous electrolyte solution, a total content of the another component ranges from 0 wt % to 10 wt %.

11. The battery according to claim 1, wherein the non-aqueous organic solvent is selected from at least one of carbonate, carboxylic acid ester, or fluorinated ether.

12. The battery according to claim 11, wherein the carbonate is selected from one or more combinations of ethylene carbonate, propylene carbonate, dimethyl carbonate, ethyl methyl carbonate, diethyl carbonate, or methyl propyl carbonate; and/or, the carboxylic acid ester is selected from one or more combinations of ethyl propionate or propyl propionate; and/or, the fluorinated ether is selected from 1,1,2,3-tetrafluoroethyl-2,2,3,3-tetrafluoropropyl ether.

13. The battery according to claim 1, wherein the positive electrode plate comprises a positive electrode current collector and a positive electrode active material layer coated on a surface of either or both sides of the positive electrode current collector; the positive electrode active material layer comprises a positive electrode active material; the positive electrode active material is selected from lithium cobalt oxide or lithium cobalt oxide doped and coated with two or more elements in Al, Mg, Mn, Cr, Ti, and Zr; and an chemical formula of the lithium cobalt oxide doped and coated with the two or more elements in Mg, Mn, Cr, Ti, and Zr is $Li_xCo_{1-y1-y2-y3-y4}A_{y1}B_{y2}C_{y3}D_{y4}O_2$, wherein $0.95 \leq x \leq 1.05$, $0.01 \leq y1 \leq 0.1$, $0.01 \leq y2 \leq 0.1$, $0 \leq y3 \leq 0.1$, $0 \leq y4 \leq 0.1$, and A, B, C, and D are selected from the two or more elements in Al, Mg, Mn, Cr, Ti, and Zr.

14. The battery according to claim 1, wherein the negative electrode plate comprises a negative electrode current collector and a negative electrode active material layer coated on a surface of either or both sides of the negative electrode current collector; the negative electrode active material layer comprises a negative electrode active material; and the negative electrode active material is graphite.

15. The battery according to claim 1, wherein a charge cut-off voltage of the battery is 4.45 V or above.

16. The battery according to claim 1, wherein the battery is obtained by winding the positive electrode plate, the separator and the negative electrode plate; the termination tape is attached at an end of the positive electrode plate; and a part of the termination tape covers the paste on a surface of the positive electrode current collector, and the other part covers a foil uncoating region on a surface of the positive electrode current collector.

17. The battery according to claim 1, wherein the termination adhesive layer comprises at least one of isooctyl acrylate, n-butyl acrylate, methyl acrylate, ethyl acrylate, n-propyl acrylate.

* * * * *